UNITED STATES PATENT OFFICE.

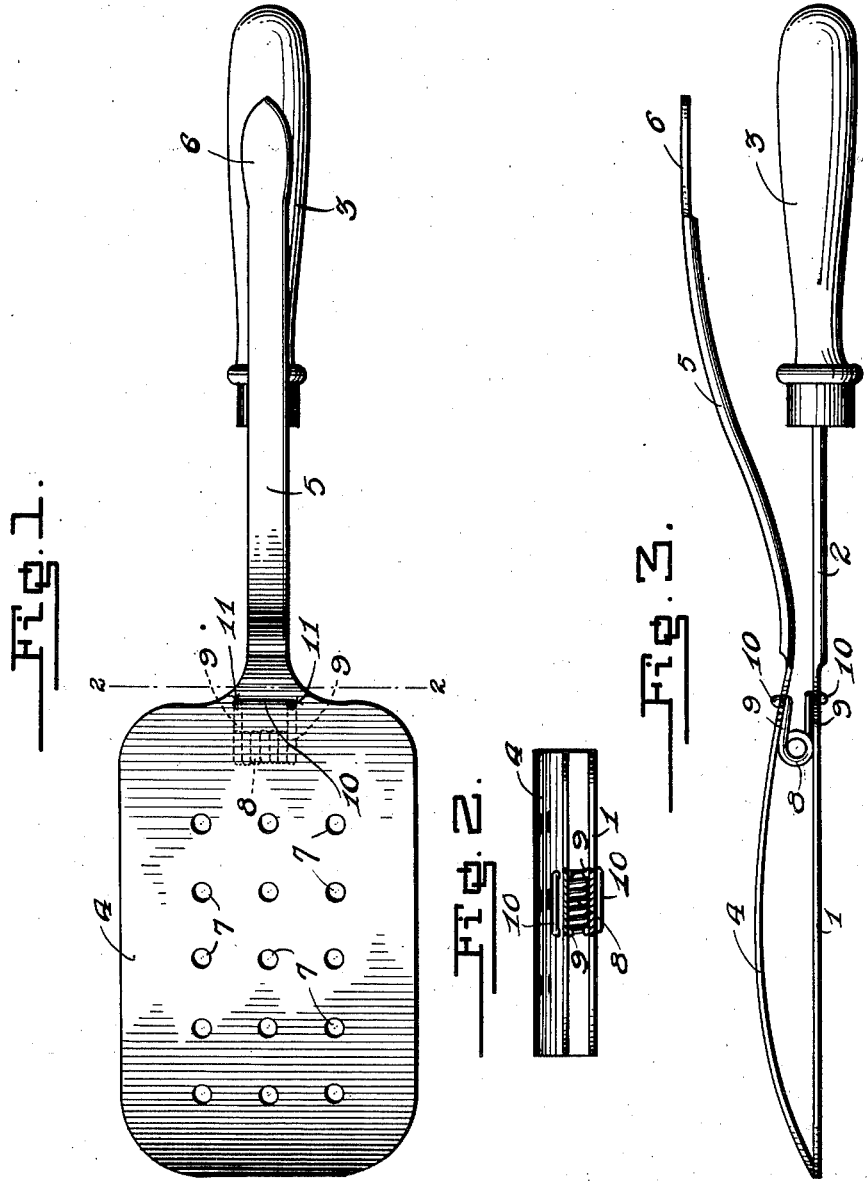

JAMES A. SWEETING, OF NEW YORK, N. Y.

TURNER.

967,263.  Specification of Letters Patent.  Patented Aug. 16, 1910.

Application filed May 10, 1910. Serial No. 560,461.

*To all whom it may concern:*

Be it known that I, JAMES A. SWEETING, a citizen of the United States of America, residing at New York, in the county of New York and State of New York, have invented certain new and useful Improvements in Turners, of which the following is a specification, reference being had therein to the accompanying drawing.

This invention relates to kitchen utensils which are used for manipulating articles which are being cooked in a frying-pan or other receptacle, such as steaks, eggs, pancakes, etc., and which are utilized to turn such articles over repeatedly as they are being cooked.

This invention has for its object to provide an improved utensil of this kind, by means of which the turning over of articles while being cooked can be easily accomplished, and the spilling or splattering of grease on the stove, floor, or the person handling the utensil will be avoided.

Referring to the accompanying drawings: Figure 1 is a plan view of a kitchen utensil constructed in accordance with this invention. Fig. 2 is an end view of the main portion of the device in cross section on the line 2—2 of Fig. 1. Fig. 3 is a side view of the invention.

In carrying out the invention, a blade 1 is provided stamped out of sheet-metal and preferably of an oblong rectangular shape and having a tang 2 which is secured in a wooden handle 3. In conjunction with the blade 1 there is provided a blade 4 which is also preferably of an oblong rectangular shape, and also preferably slightly curved as shown in Fig. 3, said blade being formed from a blank of sheet-metal and having the arm 5 projecting from one end thereof and extending over the tang 2 and handle 3 and terminating in a thumb-piece 6. The blade 4 is preferably formed with a number of holes 7 to aid in handling the article which rests thereon when the utensil is inverted. The blades 1 and 4 are hinged together at their adjacent ends close to the juncture therewith of the tang 2 and the arm 5 by any suitable form of hinge. As here shown, they are preferably hinged together by means of a spring hinge which consists of a piece of wire bent to form a coil 8, and the arms 9 which extend parallel with each blade and have a laterally turned end 10 which projects through the hole 11 in each of the blades 1 and 4, and is bent over to hold the hinge securely in place. By means of this spring hinge the outer end of the blade 4 will be held against the blade 1 by the tension of the spring hinge, and when the arm 5 is pressed toward the handle 3 the tension of the spring will be increased and act to move the blade 4 against the blade 1 when the arm 5 is released.

It will readily be seen that with the utensil held by the handle 3 and the arm 5 pressed down against the handle 3, the blade may be moved under the article being cooked and then the arm 5 being released the blade 4 is closed over said article and the latter may then be lifted from the cooking utensil and the lifting utensil may then be turned over without any danger of spilling the article clamped between the blades 1 and 4. The article may then be placed back in the cooking utensil in an inverted position, and by separating the blades 1 and 4, the blade 4 may be withdrawn from the article, the curved form of the blade aiding in releasing the article therefrom.

It will be seen that by means of this invention a simple, economical and efficient kitchen utensil is provided by means of which the handling and turning over of articles being cooked is greatly facilitated.

Having described the invention, I claim:

A kitchen utensil of the character described, consisting of an oblong thin rectangular blade having a handle, a blade spaced from said blade and having its outer end projecting downward and bearing against the outer end of said blade and having a handle at its rear end spaced from and projecting parallel with the handle of the first blade, and a hinge connecting said blades together and consisting of a coiled strip of wire having its ends connected to said blade.

In testimony whereof I hereunto affix my signature in presence of two witnesses.

JAMES A. SWEETING.

Witnesses:
W. WILLARD BABCOCK,
H. S. WITTMAAK.